(12) United States Patent
Parginos

(10) Patent No.: US 11,723,492 B1
(45) Date of Patent: Aug. 15, 2023

(54) DETACHABLE HANDLE SYSTEM FOR POTS

(71) Applicant: NIKPAR LLC, Brooklyn, NY (US)

(72) Inventor: Nikolaos Parginos, Brooklyn, NY (US)

(73) Assignee: NIKPAR, LLC, Brooklyn, NY (US)

( * ) Notice: Subject to any disclaimer, the term of this patent is extended or adjusted under 35 U.S.C. 154(b) by 0 days.

(21) Appl. No.: 17/684,487

(22) Filed: Mar. 2, 2022

(51) Int. Cl.
*A47J 45/06* (2006.01)
*A47J 36/10* (2006.01)

(52) U.S. Cl.
CPC ............ *A47J 45/061* (2013.01); *A47J 36/10* (2013.01)

(58) Field of Classification Search
CPC .......... A47J 45/00; A47J 45/06; A47J 45/061; A47J 45/067; A47J 45/07; A47J 45/071; A47J 45/072; A47J 45/10; A47J 45/078
See application file for complete search history.

(56) References Cited

U.S. PATENT DOCUMENTS

| 7,832,329 | B2 * | 11/2010 | Crescenzi | A47J 31/303 |
| | | | | 99/323.1 |
| 8,381,635 | B2 * | 2/2013 | O'Brien | A47J 31/34 |
| | | | | 99/302 R |
| 2020/0121103 | A1 * | 4/2020 | Cheng | A47G 19/22 |
| 2020/0245819 | A1 * | 8/2020 | Besche | A47J 45/071 |
| 2021/0321828 | A1 * | 10/2021 | Stevenson | A47J 45/071 |

FOREIGN PATENT DOCUMENTS

| KR | 2016135008 A * | 11/2016 | A47J 45/07 |
| KR | 1967102 B1 * | 4/2019 | A47J 45/07 |

* cited by examiner

*Primary Examiner* — Javier A Pagan
(74) *Attorney, Agent, or Firm* — Patrick Stanzione; Stanzione & Associates, PLLC

(57) ABSTRACT

A detachable handle system for a pot, the system including a detachable handle and a lower cap which attaches to the pot. The detachable handle includes a non-corrosive spring-loaded locking system to lock to and unlock from the lower cap, and a push button which causes the detachable handle to lock to and unlock from the lower cap when operated.

19 Claims, 6 Drawing Sheets

DETACHABLE HANDLE SYSTEM FOR POTS

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

1. Field of the Invention

The present inventive concept relates to a detachable handle system for pots. More particularly, but not exclusively, this inventive concept relates to a mechanically detachable handle system for pots, such as coffee pots, Greek coffee pots, Turkish coffee pots, espresso coffee pots, kettles, etc.

Description of the Related Art

Conventional coffee pots for preparing specialty coffees, such as Turkish coffee, Greek coffee and espresso are generally smaller and have an elongated handle for lifting and moving the pot to and from a heat source. The elongated handles on these types of coffee pots generally include a threaded extension part extending from one end of the handle for threading with corresponding threads extending from the pot itself in order to attach and detach the handle from the pot. Detaching the handle from the pot is necessary in order to clean the coffee pot while preventing the wooden handle from continuous exposure to water, which destroys the wood.

FIG. 1 illustrates a common Greek coffee pot 10. Here the coffee pot 10 consists of the pot 11 itself, which includes an extended portion 12 with threads 12a formed therein, and a handle portion 20, which includes threads 20a extending from one end to be threaded into the threads 12a of the pot 11. The handle 20 is commonly made of wood in order to resist heat while the pot 11 (and hot water therein) is being heated on a heat source, such as a heating element or a contained fire. When the pot 11 needs cleaning after each use, the handle 20 is generally removed in order to avoid the wood from deteriorating due to exposure to water. However, in order to remove the handle 20, one must unscrew the threads 20a from the threads 12a, which is a time consuming process. Further, the handle 20 cannot be easily removed if the pot 11 is still hot due to the process of preparing the coffee over a heat source. Moreover, the threads 12a and 20a are generally made of a metal, which corrodes over time due to the moist environments in which such coffee pots 10 are subjected to. As a result of exposure to moisture, the threads 12a and 20a eventually become corroded to the extent that threading and unthreading the handle 20 from the pot 11 is no longer feasible, which renders the coffee pot 10 useless.

There is a need for a pot handle that can be removed from the pot without requiring threading and unthreading each time the pot requires cleaning.

There is also a need for a pot handle which can easily be attached and detached without having to hold the hot pot in place while the handle is being unscrewed from the pot.

There is also a need for a pot handle which does not include parts which are subject to corrosion.

SUMMARY OF THE INVENTIVE CONCEPT

The present inventive concept relates to a detachable handle system for pots. More particularly, but not exclusively, the inventive concept relates to a mechanically detachable handle system for pots, such as, for example coffee pots, Greek coffee pots, Turkish coffee pots espresso coffee pots, kettles, etc.

More particularly, but not exclusively, the present inventive concept relates to a mechanically detachable handle system for pots and specialty coffee pots, such as Greek coffee pots, Turkish coffee pots and espresso coffee pots, which omits the need to hold the pot while removing the handle and avoids corrosion of the parts which connect the handle to the pot.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a detachable handle system for a pot including: a lower cap having a hole extending through a center thereof, the lower cap including a first end to receive the protrusion unit through the hole and a second end configured to be attached to a pot, the second end including an opening disposed therein having a larger diameter than the hole to form a seat with the hole; a detachable handle including a first end, a second end and an axial hole extending from the first end to the second end; a release button disposed at the first end of the detachable handle; a mid-cap press-fitted over the second end of the detachable handle and having a protrusion unit protruding at an outer side thereof and extending away from the second end of the detachable handle, the protrusion unit including an axial hole extending therethrough, a first end protruding from the end cap, and a second end including an opening formed therein and in connection with the hole, a plurality of side holes extending circumferentially around and through the protrusion unit, and a locking ball disposed at each of the side holes; and a spring-loaded rod assembly extending through the axial hole in the detachable handle, the spring-loaded rod assembly being connected at a first end to the release button and having a locking member formed at a second end thereof, the locking member being disposed with the hole of the protrusion unit and configured to force the locking balls to partially extend out of respective ones of the side holes and engage with the seat of the mid-cap to lock the protrusion unit to the lower cap when the release button is released, and to enable to locking balls to extend into the respective side holes and disengage from the seat when the release button is pressed to allow to protrusion unit to slide out of the hole in the mid-cap.

In an example embodiment, the hole in the lower cap can be hexagonal in shape and the protrusion unit can be hexagonal in shape.

In another example embodiment, the protrusion unit may further include a seat formed between the opening and the hole in which the locking member becomes seated when the release button is released.

In another example embodiment, the spring-loaded rod may include a first rod directly connected at a first end to the release button and having internal threads formed at a second end, and a second rod including a first end having external threads to thread into the first rod, and a second end directly connected to the locking member, and a spring disposed around the second rod.

In still another example embodiment, the system may further include a threaded nut threaded to the threads on the second rod to secure the spring around the second rod and against an inner surface of the end cap.

In yet another example embodiment, the lower cap may be formed of brass.

In yet another example embodiment, the system may further include an end cap press-fit over the first end of the detachable handle, where the end cap may have a cylindrical shape and extends past the first end of the detachable handle to receive the release button therein and to guide back and forth movements of the release button therein.

The foregoing and/or other features and utilities of the present general inventive concept may also be achieved by providing a detachable handle system for a pot including: a detachable handle including a spring-loaded release button system extending through a center thereof, the spring-loaded button system including a release button disposed at a first end of the detachable handle and a locking member disposed at a second end of the detachable handle, wherein the locking member is configured to be in an unlocking position when the release button is pressed and in a locking position when the release button is released; and a lower cap member including: an axial hole formed therethrough; a seat formed within the hole; a first end to receive the locking member through the axial hole such that the locking member locks to and unlocks from the seat when the release button is operated; and a second end configured to attach to a pot.

In an example embodiment, the system may further include: an end cap connected to the first end of the detachable handle to receive and guide the release button therein; and a mid-cap disposed at the second end of the detachable handle and including a protrusion unit extending therefrom, the protrusion unit including a first end extending from the mid-cap, an axial hole extending therethrough and a second end having an opening therein in connection with the axial hole, the opening being configured to receive and guide movement of the locking member.

In another example embodiment, the protrusion unit may further include: at least two side holes extending therethrough at the opening, where each side hole may include a locking ball fitted therein such that when the release button is in a released position the locking member moves to a position within the opening in the protrusion unit to push the locking balls partially through the side holes to lock to the seat in the lower cap and when the release button is pressed the locking member moves to a position outward of the opening in the protrusion unit to guide the locking balls to a position fully within the opening of the protrusion unit to unlock the locking balls from the seat in the lower cap.

The foregoing and/or other features and utilities of the present general inventive concept may also be achieved by providing a detachable handle system for a pot including: a lower cap unit including a first end configured to be permanently attached to a pot and a second end configured to lockingly receive a detachable handle; and a detachable handle including a first end having a release button connected to a first end of a spring-loaded rod assembly having a locking member connected thereto, and a second end including a protrusion unit which is lockingly receivable by the lower cap, the protrusion member including the locking member disposed therein and configured to engage and disengage locking balls disposed therein to lock onto and unlock from the lower cap unit when the release button is operated.

In an example embodiment, the lower cap unit may include a hexagonal hole extending through a center thereof and an opening disposed at the first end to form a seat with the hexagonal hole to be engaged by the locking balls.

In another example embodiment, the system may further include a mid-cap press fit over the second end of the detachable handle, wherein an inner surface of the mid-cap provides a seat for one end of a spring of the spring-loaded rod and an outer surface of the mid-cap is connected to the protrusion unit.

In still another example embodiment, the spring-loaded rod may include a first rod directly connected at a first end to the release button and a second end including threads formed therein, and a second rod having a first end with external threads formed thereon to be threaded into the second end of the first rod and a second end directly connected to the locking member.

In yet another example embodiment, the system may further include a threaded nut threaded onto the threads on the second rod, the threaded nut being disposed in contact with a second end of the spring to apply a force to the spring when the release button is pressed.

In still another example embodiment, the system may further include an end cap press fit over the first end of the detachable handle and configured to receive the release button therein and support back and forth movement thereof.

In yet another example embodiment, the release button, lower cap, spring-loaded rod, mid-cap and end cap are formed of brass.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
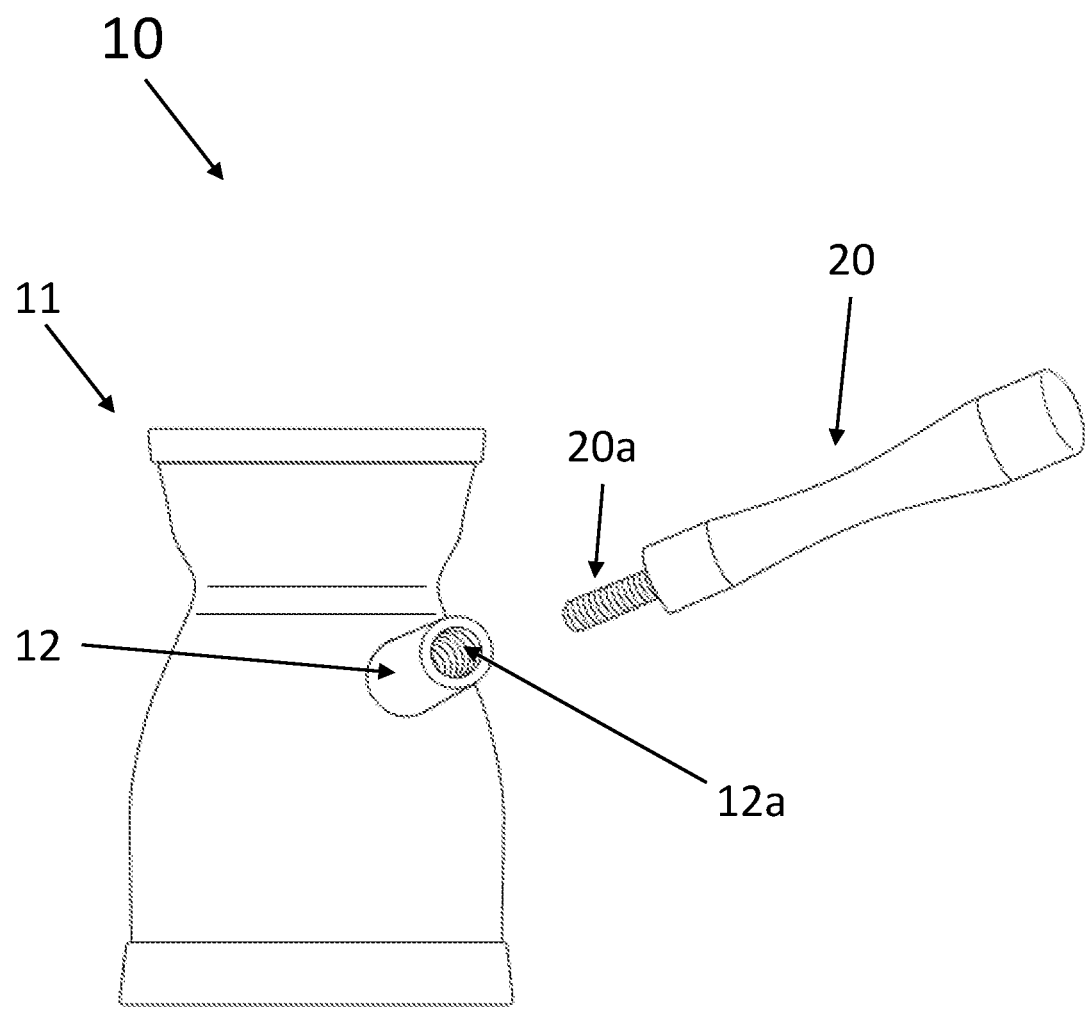
FIG. 1 illustrates a conventional Greek coffee pot and handle combination.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms, including descriptive or technical terms, which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Example embodiments of the present general inventive concept are directed to a detachable handle system for a specialty coffee pot, and particularly to a detachable handle system for a small hand held specialty coffee pot, such as a Greek coffee pot, or Turkish coffee pot and an espresso coffee pot.

Figure 2A:
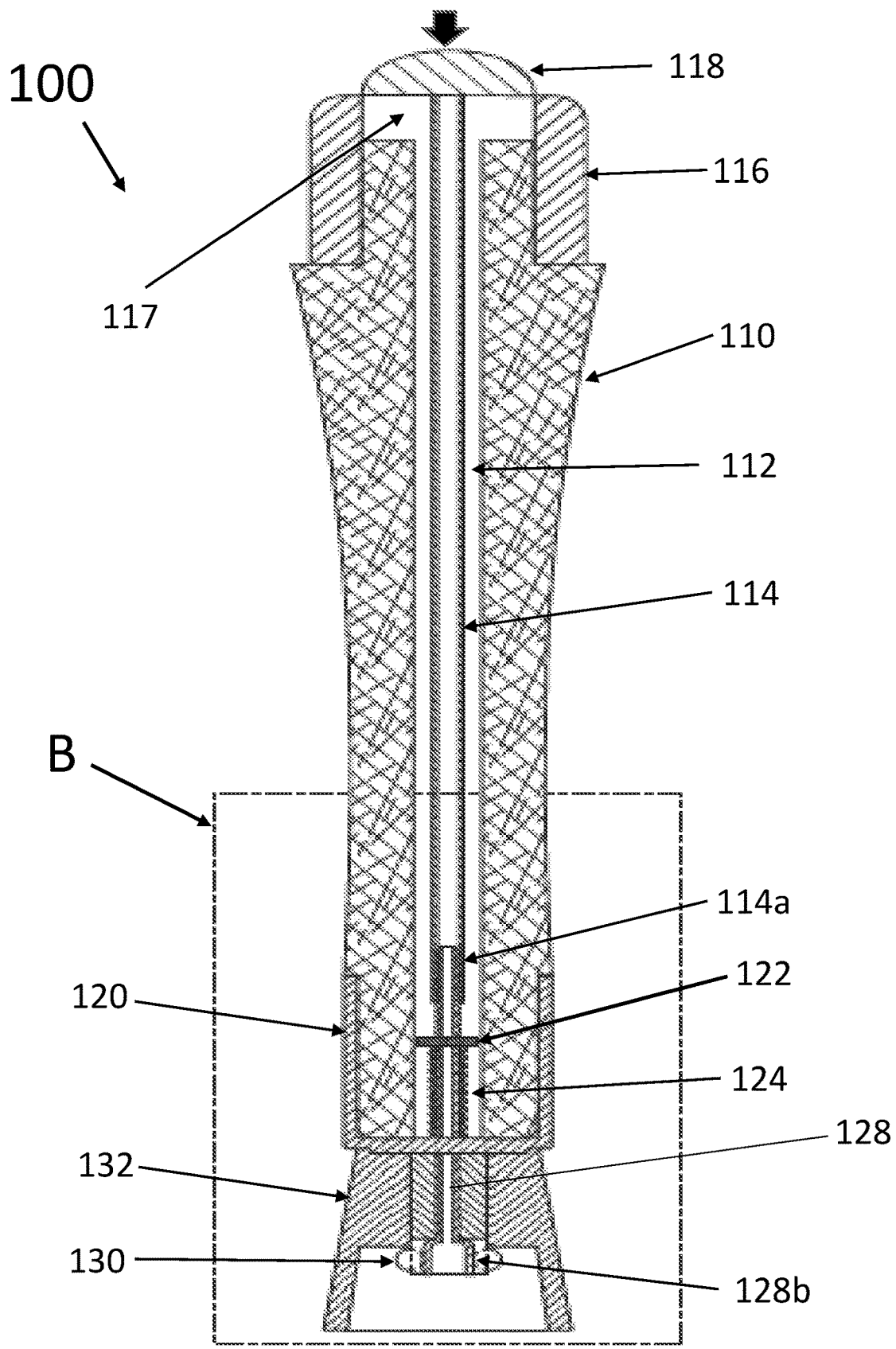
FIG. 2A illustrates a cross-sectional view of a detachable handle for a pot, in accordance with an exemplary embodiment of the present inventive concept.

FIG. 2A illustrates a detachable handle assembly 100 for a pot, according to an example embodiment of the present inventive concept. The detachable handle assembly 100 includes an elongated detachable handle 110 and a lower cap 132. The lower cap 132 can include a first end which is mechanically attachable to and detachable from a second end of the detachable handle 110. The lower cap 132 is configured to permanently attach to a side of a pot, such as, for example a Greek coffee, Turkish coffee pot, or an espresso coffee pot. The lower cap 132 can be made of brass or other types of non-corrosive metals. The lower cap 132 can be permanently attached to the side of a coffee pot by welding the second end thereof to a side portion of the coffee pot. The lower cap 132 can include a hexagonal hole 132a protruding through a center thereof and an opening 132b formed wider than the hexagonal hole 132a disposed at the second end thereof, which attaches to the coffee pot. As a result of the opening 132b being formed to join with the hexagonal hole 132a, a seat 134 is formed therebetween which is described in more detail with respect to FIGS. 2C and 3B.

The lower cap 132 is described in more detail below with reference to FIGS. 2C and 3A. It is to be noted that the detachable handle assembly 100 according to FIG. 2A can be used with any type of pot, pan or kettle, and the detailed description herein with refer to a coffee pot only to provide brevity of the detailed description below.

The handle 110 is preferrable formed of wood, but is not limited thereto, and can be formed of other type(s) of materials which can withstand heat while having material properties that will remain cool when the pot is being heated. The second end of the handle 110 is configured to be mechanically detachable from and attachable to the first end of the lower cap 132 by pressing a release button 118, which is disposed at a first end of the handle 110. The first end of the handle 110 can have a section thereof with a smaller outer diameter than the rest of the handle 110 such that a hollow circular end cap 116 can be pressure fitted thereover. It will be appreciated by one of ordinary skill in the art that the circular end cap 116 can be attached to the first end of the handle 110 by alternative means for attaching parts of kitchen devices, such as adhesives, screws, etc.

The hollow inner portion of the end cap 116 can extend past the first end of the handle 110 to form a space 117 between the release button 118 and the first end of the handle 110, such that the release button 118 can fit within the space 117 and move toward and away from the first end of the handle 110 with the aid of a spring force, as described in more detail below. The circular end cap 116 is preferable formed of brass, which is non-corrosive and well as being semi-flexible so as to be easily press fit over the first end of the handle 110. However, as pointed out above, the circular end cap 116 can be attached to the first end of the handle 110 by other means of attachment, which will keep the end cap 116 and handle 110 attached to each other.

Once the lower cap 132 is permanently attached to the side of a pot, such as a coffee pot, the handle 110 can also be mechanically attachable to and detachable from the coffee pot by holding the handle 110 in one hand while pressing an exposed side of the release button 118 inward within the end cap 116 and space 117 toward the handle 110. In other words, when the exposed side of the release button 118 is pressed inward toward the first end of the handle 110, a plurality of mechanisms (described in more detail below) operate to disengage the handle 110 from the lower cap 132 so that the handle 110 can be easily detached from the coffee pot, and when the release button 118 is released the handle 110 can be engaged with and locked to the lower cap 132 (and hence the coffee pot).

The handle 110 can include an axial hole 112 extending through an entire length thereof. A first rod 114 is configured to be attachable at a first end thereof to a side of the release button 118 opposite the side of the release button 118 to be externally exposed. The first rod 114 and the release button 118 are preferably both be formed of brass. However, the first rod 114 and release button 118 can be formed of any type of metal(s) or other materials which will perform the intended purposes as described herein. The first rod 114 is preferably attached to the release button 118 via welding. However, the first rod 114 and release button 118 can be attached together via corresponding sets of threads, or any other means which securely fasten the first rod 114 and release button 118 together.

Figure 2B:
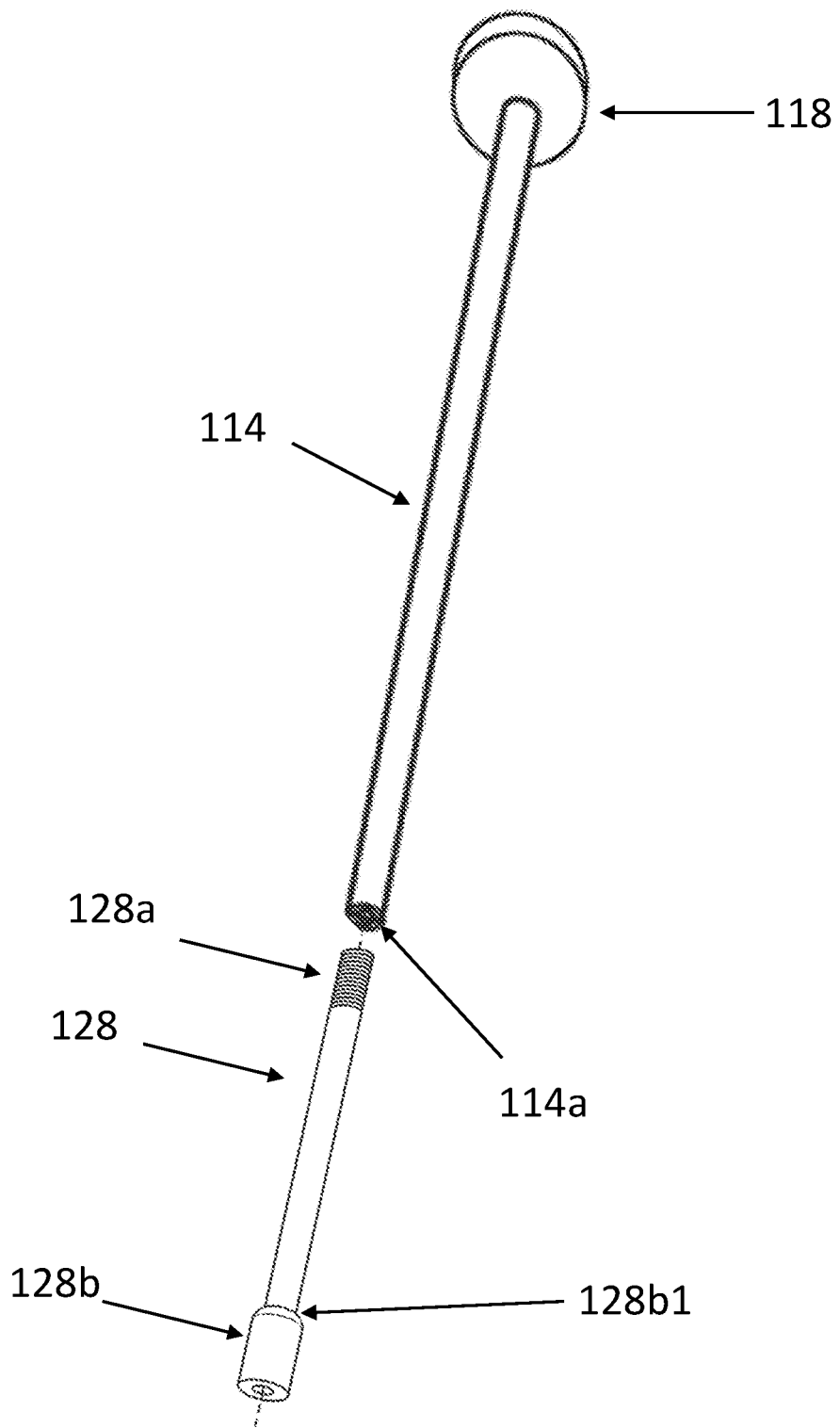
FIG. 2B illustrates an exploded elevational view of a button and first and second rods of the detachable handle according to the example embodiment of FIG. 2A.

Referring to FIGS. 2A and 2B, the first rod 114 can include internal threads 114a formed within a second end thereof opposite the end which is attached to the release button 118. The first rod 114 can be inserted through the axial hole 112 of the handle 110 and threaded to a first end of a second rod 128. The first end of the second rod 128 can include external threads 128a formed thereon which correspond with the threads 114a formed within the second end of the first rod 114. The threads 128a formed on the first end of the second rod 128 can extend partially along the length of the second rod 128 sufficient to receive a threaded nut 122 thereon while being threaded into the second end of the first rod 114. The second rod 128 preferably also includes a locking member 128b extending from a second end thereof opposite the first threaded end. The locking member 128b can include a rounded shoulder 128b1 extending from the second rod 128 (see FIG. 2B) to easily permit locking balls (described in more detail below) to roll onto and off an outer surface of the locking member 128b. However, alternative transitional equivalent shapes can be provided between the second rod 128 and the locking member 128a which will provide the intended purposes of moving the locking balls to locking and unlocking positions, as described herein.

Figure 2C:
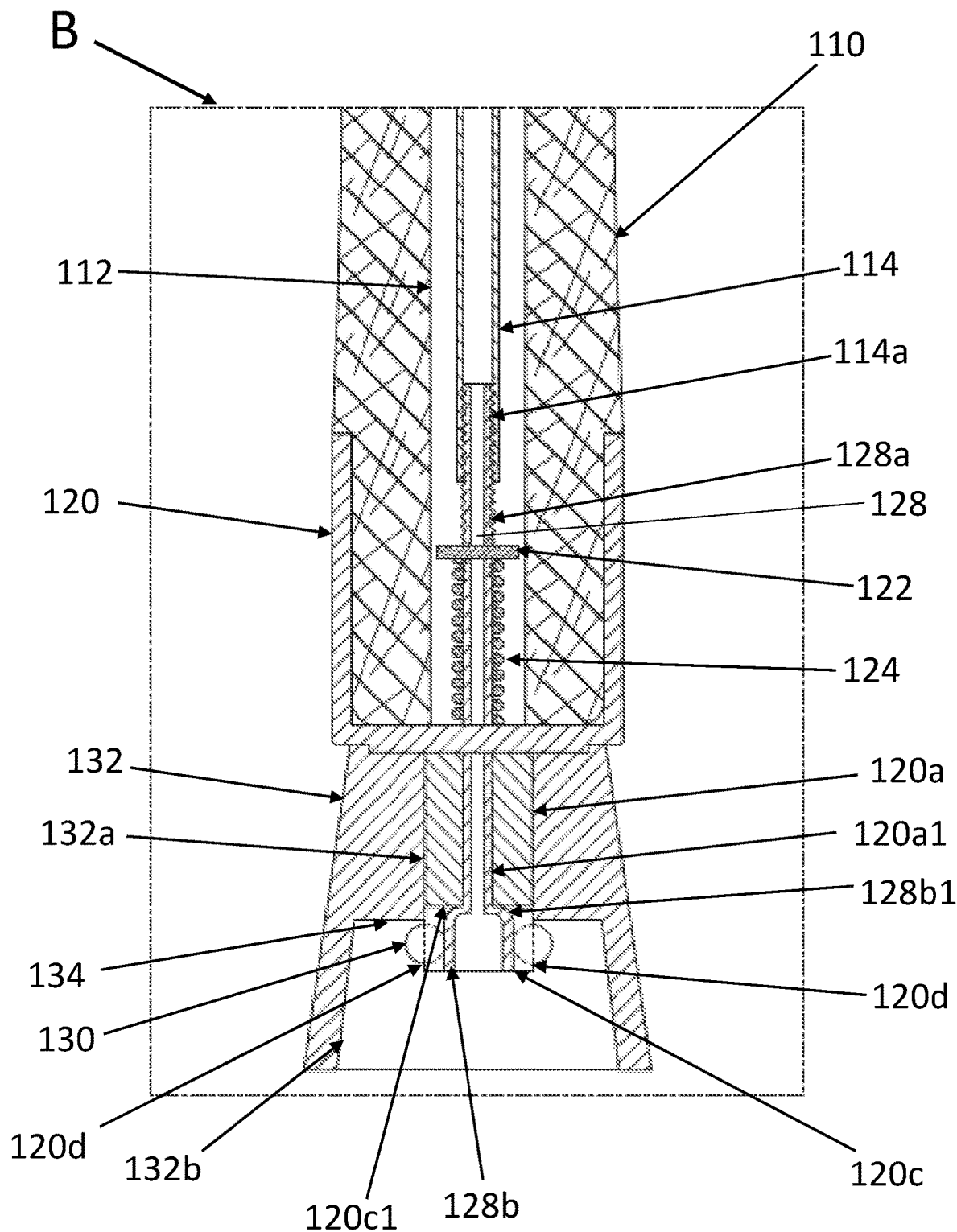
FIG. 2C illustrates an expanded cross-sectional view of a lower portion of the detachable handle according to the example embodiment of FIG. 2A.

A plurality of mechanical parts which operate to attach and detach the handle 110 from the lower cap 132 are illustrated within a dash lined box B of FIG. 2A, which are also provided in a more expanded view as illustrated in FIG. 2C.

Referring to FIGS. 2A and 2C, the second end of the handle 110 can include an end cap 120 fitted thereover. Similar to the circular end cap 116 described above, the mid-cap 120 can be press fitted over the second end of the handle 110, or can be attached to the second end of the handle 110 by alternative equivalent means for attaching parts of kitchen devices, such as adhesives, screws, etc.

The mid-cap 120 can include a circular hollow inner portion which is configured to snuggly fit over the second end of the handle 110. The mid-cap 120 can also include a protrusion unit 120a protruding outwardly from an outer surface thereof. The protrusion unit 120a is preferably formed in a hexagonal shape in order to be inserted through the hexagonal hole 132a formed through the lower cap 132. However, the hexagonal hole 132a can be formed of alternative equivalent shapes which will perform the intended purposes as described herein. The mid-cap 120 is preferably formed of brass. However, the mid-cap 120 can alternatively be formed of any other type of metal(s) that will perform the intended purposes as described herein. It is to be noted that the hole 132a in the lower cap 132 and the protrusion unit 120a can have corresponding shapes other than a hexagonal shape as long as the protrusion unit 120a slides along the inner surfaces of the hole 132a and the locking balls 130 (described in more detail below) remain adjacent to respective side holes 120d when the locking balls 130 are slide over the surface of the locking member 128b and over the shoulders 128b1 as the release button 118 is pressed and released.

The protrusion unit 120a of the mid-cap 120 is preferably solid, while having a center hole 120a1 extending axially through the center thereof to receive the first end of the second rod 128 therethrough. An opening 120c is formed through an end of the protrusion unit 120a opposite the end protruding from the end cap 120. The opening 120c connects with the center hole 120a1 and has a larger diameter than the center hole 120a1. The opening 120c forms a seat 120c1 with the hole 120a1 in which the shoulders 128b1 of the locking member 128b will rest when the locking member 128b is fully inserted into the opening 120c.

Disposed around the protrusion unit 120a of the mid-cap 120 where the opening 120c is formed are at least two side holes 120d extending therethrough, and preferably three side holes 120d each to receive a respective locking ball 130 therein from within the opening 120c of the protrusion unit 120a. However, any alternative number of side holes 120d can be provided which will perform the intended purposes as described herein. The side holes 120d are preferably slightly smaller in diameter than the locking balls 130 such that the locking balls 130 cannot pass entirely through the respective side holes 120d, while being able to protrude past the outer surface of the protrusion unit 120a. More specifically, the opening 120c is configured to receive the locking member 128b therein while the second rod 128 extends through the first hole 120a1 to be threaded with the first rod 114.

After the second rod 128 is inserted through the opening 120c and through the center hole 120a1 of the protrusion unit 120a, a spring 124 is placed over the second rod 128. Once the second rod 128 is completely inserted through the spring 124 a threaded nut 122 is threaded onto the threads 128a of the second rod 128. The threaded nut 122 is provided to secure the spring 124 between the nut 122 and an inner surface of the mid-cap 120 surrounding the first hole 120a1. The spring 124 has a diameter sufficiently larger than the diameter of the first hole 120a1 so that the spring 124 cannot slide through the first hole 120a1 and remains within the mid-cap 120. The threads 128a of the second rod 128 can then be threaded into the internal threads 114a of the first rod 114 while the mid-cap 120 is press fitted over the second end of the handle 110. At this point the locking member 128b will be fully inserted into the opening 120c of the protruding unit 120a until the shoulders 128b1 rest against the seat 120c1 formed between the opening 120c and the hole 120a1. The combination assembly of the release button 118, first and second rods 114, 128, nut 122 and spring 124 is herein referred to as a "spring-loaded release button system." It is to be noted that the nut 122 can be alternatively replace with other similar parts which will contain the spring 124 pressed against the inner surface of the mid-cap 120 such that the spring-loaded release button system will have a return spring force when the release button 118 is pressed.

When the locking member 128b is being inserted into the opening 120c of the protruding unit 120a as the second rod 128 is being inserted through the center hole 120a1 of the protrusion unit 120a, the outer surface of the locking member 128b pushes the locking balls 130 into their respective side holes 120d such that the locking balls 130 protrude outward past the outer surface of the protrusion unit 120a by a predetermined amount. As pointed out above, the locking member 128b is stopped within the opening 120c of the protrusion unit 120a by the shoulder 120c1 formed between the opening 120c and the hole 120a1.

Referring to FIGS. 2A and 2C, when the handle 110 and mid-cap 120 are fully assembled, the release button 118 can be pressed (FIG. 2A) to operate the locking and unlocking of the handle 110 from the lower cap 132 as follows. When the release button 118 is pressed, the first rod 114, second rod 128 and nut 122 are pushed simultaneously such that the nut 122 compresses the spring 124 while the shoulders 128b1 of the locking member 128b slide over the locking balls 130 as the locking member 128b extends outward of the opening 120c of the protrusion unit 120a. As a result of pressing the button 118 the locking balls 130 roll off the outer surface of the locking member 128b and are caused to roll inward of the respective side holes 120d, thus no longer protruding past the outer surface of the protrusion unit 120a. At this point the protrusion unit 120a can be inserted through the hexagonal hole 132a of the mid-cap 132.

Once the protrusion unit 120a is fully inserted into the hexagonal hole 132a of the lower cap 132 the release button 118 can be released to lock the protrusion unit 120a to the lower cap 132. More specifically, when the release button 118 is released, the spring 124, while being seated on the inner surface of the mid-cap 120, applies an expanding force against the nut 122, which in turn pushes the second rod 128 (and first rod 114) upward toward the first end of the handle 110 such that the locking member 128b is forced back into the opening 120c until the shoulders 128b1 of the locking member 128b are forced up against the seat 120c1 within the opening 120c. As a result, the locking balls 130 will roll up the shoulders 128b1 of the locking member 128b and over the outer surface of the locking member 128b, thus forcing the locking balls 130 back through the respective side holes 120d to protrude past the outer surface of the protrusion unit 120a. At this point the locking balls 130 are forced to remain in the position extending partially through the respective side holes 120d and past the outer surface of the protrusion unit 120a. In this position the locking balls 130 cannot move past the seat 134 formed between the opening 132b and the hole 132a of the lower cap 132, thus locking the protrusion unit 120a (and handle 110) to the lower cap 132.

Figure 3A:
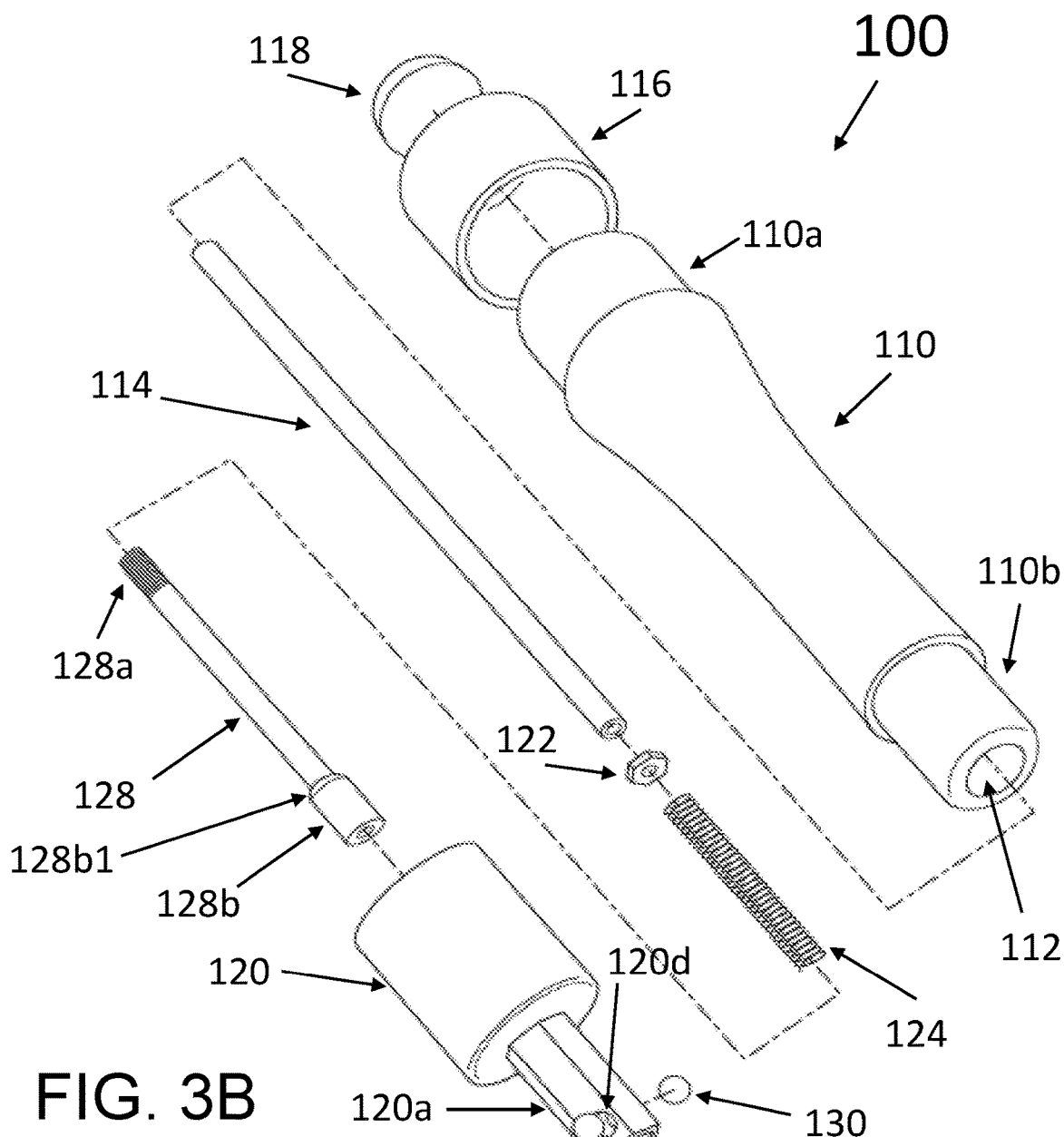
FIG. 3A illustrates an exploded plan view of the detachable handle according to the example embodiment of FIG. 2A.
Figure 3B:
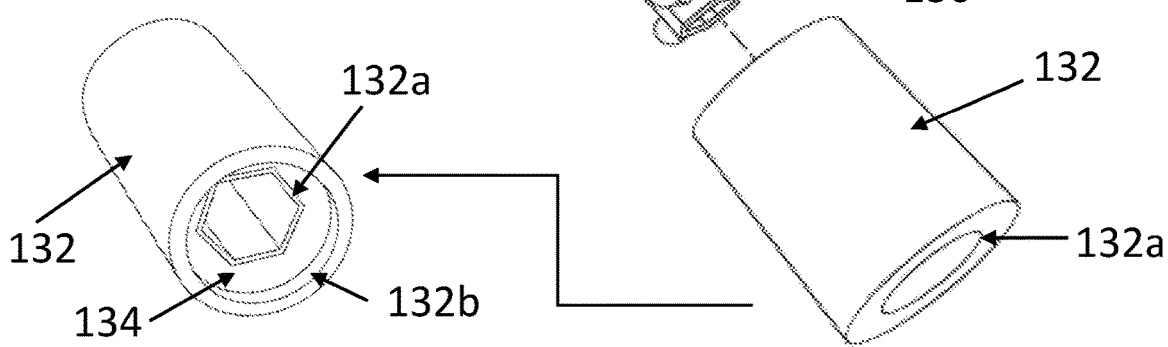
FIG. 3B illustrates an axial view of a lower cap of the detachable handle according to the example embodiment of FIG. 3A.

FIG. 3A illustrates each of the parts of the detachable handle and lower cap 132 in an unassembled yet aligned view. The brass mid-cap 116 is to be fitted over the first end of the handle 100. The attached release button 118 and first rod 114 are connected together while the second end of the first rod 114 is fed through the axial hole 112 formed through the handle 110. Then the second rod 128 is to be inserted through the opening 120c and then the center hole 120a1 of the protrusion unit 120a. The spring 124 can then be placed over the second rod 128, the nut 124 can be threaded onto the threads 128a of the second rod 128 and the threads 128a of the second rod 128 can be threaded into the threads 114a of the first rod 114 while the mid-cap 120 is press fit over the second end of the handle 110. The second rod 128 should be threaded into the first rod 114 until the locking member 128b becomes fully inserted into the opening 120c of the protrusion unit 120a and the shoulders 128b1 of the locking member 128b are seated against the seat 120c1 of the protrusion unit 120a and the locking balls 130 are forced by the outer surface of the locking member 128b to extend fully into respective side holes 120d, thus causing the locking balls 130 to protrude past the outer surface of the protrusion unit 120a. At this point the detachable handle 110 is fully assembled.

When the release button 118 of the fully assembled detachable handle 110 is pressed inward the locking member 128b is forced out of the opening 120c of the protrusion unit 120a, causing the shoulders 128b1 of the locking member 128b to slide past the locking balls 130, thus causing the locking balls 130 to roll inward of the respective side holes 120d and fully within the opening 120c. Once the locking balls are disposed within the opening 120c the protrusion unit 120a can be freely inserted through the hexagonal hole 132a of the lower cap 132 until the side holes 120d and locking balls 130 move past the hexagonal hole 132a and into the opening 132b. At this point if the release button 118 is released the spring 124 forces the nut 124 and second rod 128 toward the first end of the handle 110, which forces the locking member 128a to continually move back into the opening 120c until the shoulders 128b1 roll the locking balls 130 outward through their respective side holes 120d and the outer surface of the locking member 128b forces the locking balls 130 to protrude past the outer surface of the protrusion unit 120a, thus locking the protrusion unit 120a, mid-cap 120 and handle 110 to the lower cap 132. Since the lower cap 132 is welded to the coffee pot, the handle 110 becomes detachably attached to the coffee pot.

Figure 4:
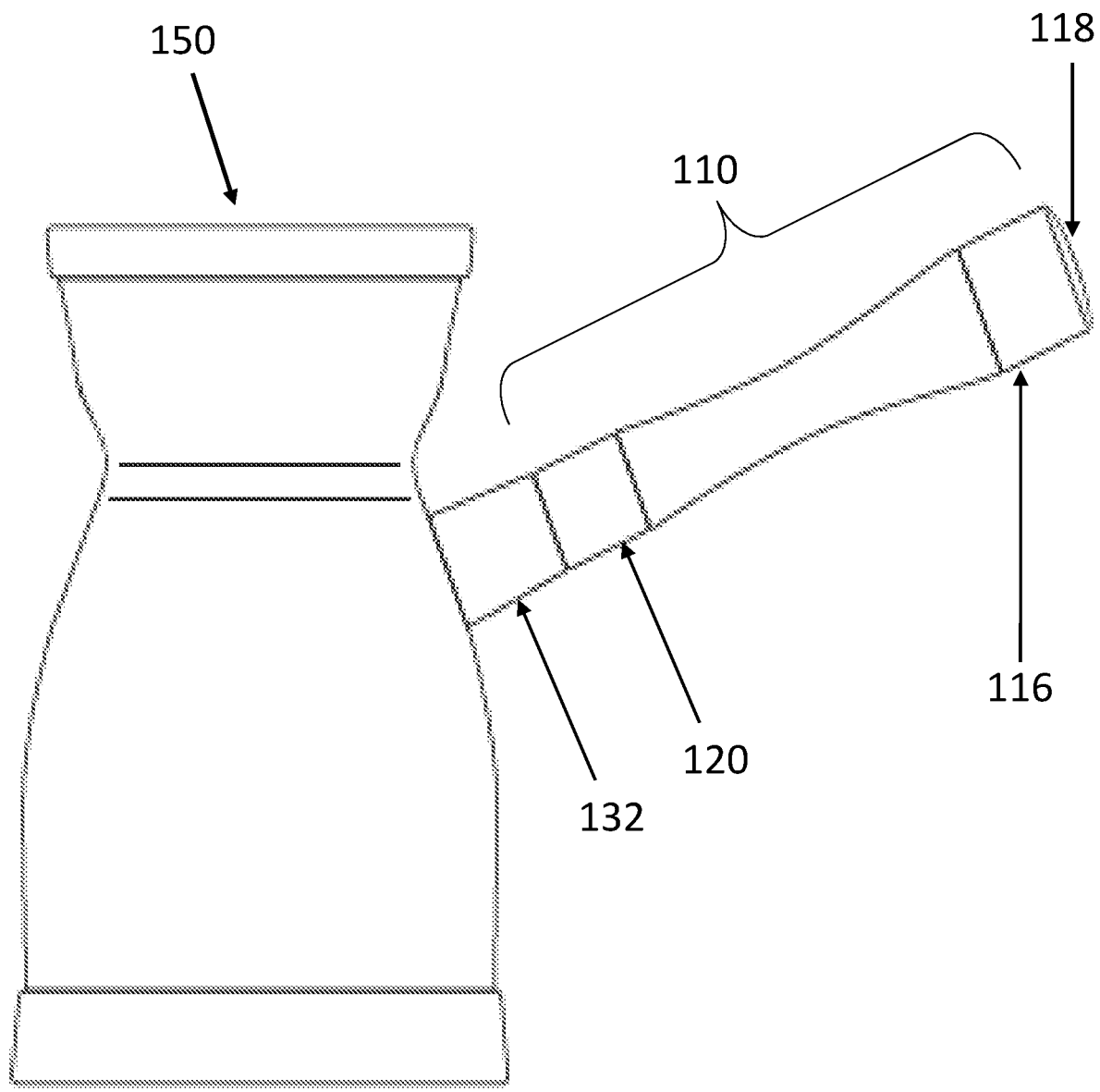
FIG. 4 illustrates the detachable handle according to the example embodiment of FIG. 2A, while being attached to a specialty Greek coffee pot.

FIG. 4 illustrates the handle 110 being fully attached and locked to a coffee pot 150, where the lower cap 132 is welded to the coffee pot 150. In this configuration the mid-cap 120 is attached to the lower cap 132 by way of the protrusion unit 120a being locked within the hole 132a of the lower cap 132. Once the release button 118 is pressed the locking member 128b will be forced to extend outward of the opening 132b in the lower cap 132 and the locking balls 130 will move inward of the respective side holes 120d of the protrusion unit 120a, thus unlocking the protrusion unit 120a from the lower cap 132, which will in return unlock the handle 110 from the lower cap 132 and coffee pot 150.

Although the present general inventive concept has been explained and illustrated in relation to its preferred embodiment(s) as mentioned above, it is to be understood that many other possible modifications and variations can be made without departing from the scope and spirit of the present inventive concept. It is, therefore, contemplated that the appended claims will cover such modifications and variations that fall within the true scope of the inventive concept.

What is claimed is:

1. A detachable handle system for a pot, comprising:
   a lower cap having a hole extending through a center thereof, the lower cap including a first end to receive a protrusion unit through the hole and a second end configured to be attachable to a pot, the second end including an opening disposed therein having a larger diameter than the hole such that the opening forms a seat around the hole;
   a detachable handle including a first end, a second end and an axial hole extending from the first end to the second end;
   a release button disposed at the first end of the detachable handle;
   a mid-cap press-fitted over the second end of the detachable handle and having a protrusion unit protruding at an outer side thereof and extending away from the second end of the detachable handle, the protrusion unit including an axial hole extending therethrough, a first end protruding from the mid-cap, and a second end including an opening formed therein and being inserted through the hole of the lower cap to extend past the seat, a plurality of side holes extending circumferentially around and through the protrusion unit adjacent to the second end, and a locking ball disposed within each of the side holes; and
   a spring-loaded rod assembly extending through the axial hole in the detachable handle, the spring-loaded rod assembly being connected at a first end to the release button and having a locking member formed at a second end thereof, the locking member being disposed with the axial hole of the protrusion unit and configured to force the locking balls to partially extend out of respective ones of the side holes of the protrusion unit and engage with the seat of the lower cap to lock the protrusion unit to the lower cap when the release button is released, and to enable the locking balls to extend into the respective side holes and disengage from the seat when the release button is pressed to allow the locking member to slide out of the axial hole in the protrusion unit.

2. The system according to claim 1, wherein the hole in the lower cap is hexagonal in shape and the protrusion unit is hexagonal in shape such that the protrusion unit cannot rotate within the hole in the lower cap.

3. The system according to claim 2, wherein the protrusion unit further includes a seat formed between the opening and the axial hole in which the locking member becomes seated when the release button is released.

4. The system according to claim 3, wherein the spring-loaded rod assembly includes a first rod directly connected at a first end to the release button and having internal threads formed at a second end, and a second rod including a first end having external threads to thread into the first rod, and a second end directly connected to the locking member, and a spring disposed around the second rod.

5. The system according to claim 4, further comprising a threaded nut threaded to the threads on the second rod to secure the spring around the second rod and against an inner surface of the mid-cap.

6. The system according to claim 5, wherein the release button, lower cap, spring-loaded rod assembly, and mid-cap are formed of brass.

7. The system according to claim 1, wherein the lower cap is formed of brass.

8. The system according to claim 1, further comprising an end cap press-fit over the first end of the detachable handle, the end cap having a cylindrical shape and extending past the first end of the detachable handle to receive the release button therein and to guide back and forth movement of the release button therein.

9. A detachable handle system for a pot, comprising:
a detachable handle including a spring-loaded release button system extending through a center thereof, the spring-loaded release button system including a release button disposed at a first end of the detachable handle and a locking member disposed at a second end of the detachable handle, wherein the locking member is configured to be in an unlocking position when the release button is pressed and in a locking position when the release button is released; and
a lower cap member including:
an axial hole formed therethrough;
a seat formed within the hole;
a first end to receive the locking member through the axial hole such that the locking member locks to and unlocks from the seat when the release button is operated; and
a second end configured to attach to a pot.

10. The system according to claim 9, further comprising:
an end cap connected to the first end of the detachable handle to receive and guide the release button therein; and
a mid-cap disposed at the second end of the detachable handle and including a protrusion unit extending therefrom, the protrusion unit including a first end extending from the mid-cap, an axial hole extending therethrough and a second end having an opening therein in connection with the axial hole and wider than the axial hole, the opening being configured to receive and guide movement of the locking member therein.

11. The system according to claim 10, wherein the protrusion unit further comprises:
at least two side holes disposed circumferentially around the second end at the opening, each side hole including a locking ball fitted therein such that when the release button is in a released position, the locking member moves to a position within the opening in the protrusion unit to push the locking balls partially through the side holes to lock to the seat in the lower cap and when the release button is pressed, the locking member moves to a position outward of the opening in the protrusion unit to guide the locking balls to a position fully within the opening of the protrusion unit to unlock the locking balls from the seat in the lower cap.

12. The system according to claim 11, wherein the at least two side holes includes three side holes disposed circumferentially around the second end.

13. A detachable handle system for a pot comprising:
a lower cap unit including a first end configured to be permanently attached to a pot and a second end configured to lockingly receive a detachable handle through an opening therethrough with a seat formed in the opening; and
a detachable handle including:
a first end and a second end;
a spring-loaded rod assembly extending through an axial hole formed therethrough and including a release button connected at a first end of the spring-loaded rod assembly and movably disposed at the first end of the detachable handle, and a locking member extending from a second end of the spring-loaded rod assembly; and
a protrusion unit having a first end extending from the detachable handle and a second end of the detachable handle and a second end lockingly receivable within the opening in the lower cap, the protrusion member including an axial hole formed therethrough, an opening formed within the second end thereof which is wider than and aligned with the axial hole therein, a set of side holes extending through a side of the protrusion unit adjacent the second end within the opening, and a locking ball disposed within each side hole, the locking member disposed within the opening and a set of holes extending through sides thereof at the opening, the opening in the protrusion unit being configured to receive the locking member therein such that when the release button is pressed, the locking balls move within the opening in the protrusion unit and when the release button is released, the locking member pushes the locking balls partly out of the respective side holes such that the locking balls lock against the seat in the lower cap unit to lock the detachable handle to the lower cap unit.

14. The system according to claim 13, wherein the lower cap unit includes a hexagonal hole extending through a center thereof and through the opening therein to form the seat in which the locking balls lock against.

15. The system according to claim 14, further comprising:
a mid-cap press fit over the second end of the detachable handle, wherein an inner surface of the mid-cap provides a seat for one end of a spring of the spring-loaded rod assembly and an outer surface of the mid-cap is connected to the first end of the protrusion unit.

16. The system according to claim 15, wherein the spring-loaded rod assembly includes a first rod directly connected at a first end to the release button and a second end including threads formed therein, and a second rod having a first end with external threads formed thereon to be threaded into the second end of the first rod and a second end directly connected to the locking member.

17. The system according to claim 16, further comprising:
a threaded nut threaded onto the threads on the second rod, the threaded nut being disposed in contact with a second end of the spring to apply a force to the spring when the release button is pressed.

18. The system according to claim 15, further comprising:
an end cap press fit over the first end of the detachable handle and configured to receive the release button therein and support back and forth movement thereof.

19. The system according to claim 18, wherein the release button, lower cap, spring-loaded rod assembly, mid-cap and end cap are formed of brass.

\* \* \* \* \*